R. J. Falconer,
Sash Fastener.
No. 793. Reissued Aug. 16, 1859.
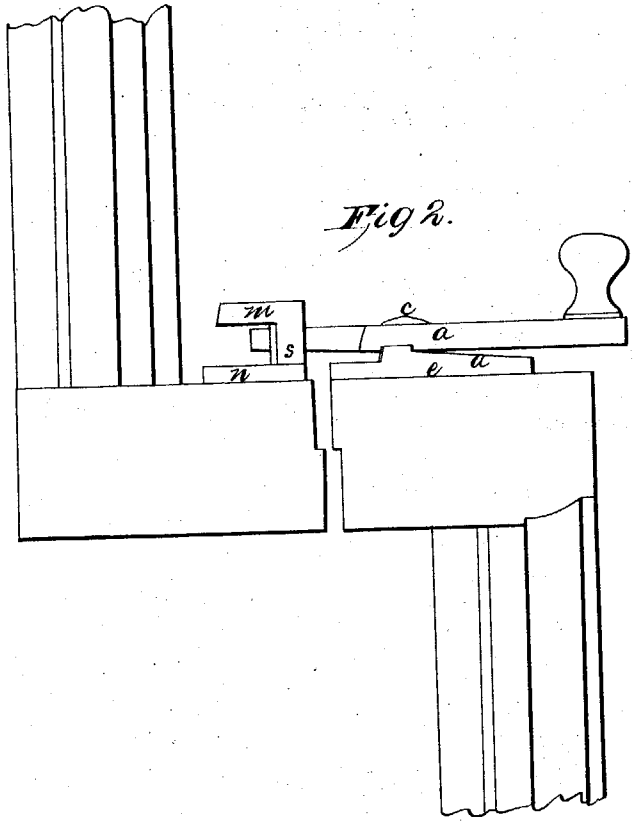
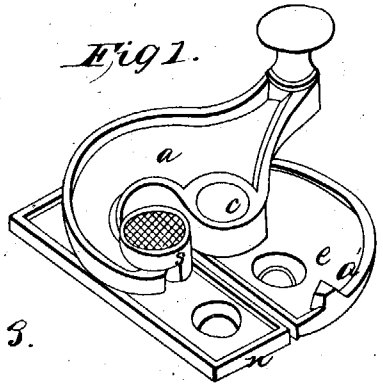
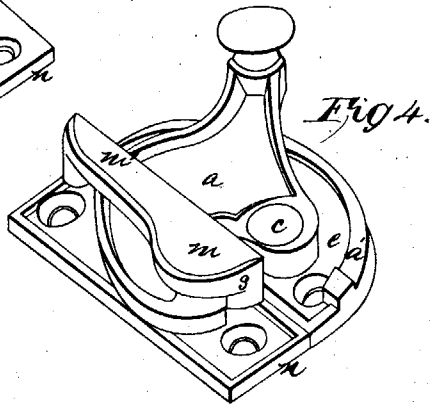
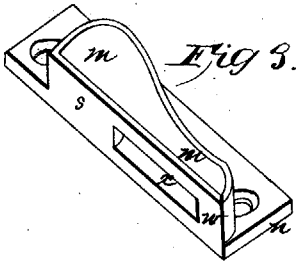
Witnesses.
Chas. G. Page
Wm. H. Harrison
Inventor.
Ralph J. Falconer
AM. PHOTO-LITHO. CO. N.Y. (OSBORNE'S PROCESS.)

UNITED STATES PATENT OFFICE.

RALPH J. FALCONER, OF WASHINGTON, DISTRICT OF COLUMBIA.

IMPROVED SASH-FASTENER.

Specification forming part of Letters Patent No. 21,328, dated August 31, 1858; Reissue No. 793, dated August 16, 1859.

*To all whom it may concern:*

Be it known that I, RALPH J. FALCONER, of Washington, in the county of Washington and District of Columbia, have invented an Improvement in Window-Fasteners; and I do hereby declare that the following is a full, clear, and exact description of the principle or character which distinguishes it from all other things before known, and of the usual manner of making, modifying, and using the same, reference being had to the accompanying drawings, of which—

Figure 1 represents an old kind of fastening upon which my improvement is made. Fig. 2 is a section through the meeting-rails of the upper and lower sashes, with a side view of the fastening applied. Figs. 3 and 4 represent the new fastening.

My invention consists in an improvement in that class of window-fasteners in which the two parts of the fastener are secured upon the meeting-rails of the upper and lower sashes, described as follows:

The principal parts of my fastener are designated as "hook" and "catch." The hook part *a* is made of the form and size indicated in Figs. 1, 2, 3, and 4. It is pivoted at *c* to the brass plate *e*, this plate being designed to be screwed upon the meeting-rail of the lower sash. The catch *m* is of the form and size shown in the several figures, and is a part of the catch-plate *n*, which is designed to be screwed upon the meeting-rail of the upper sash. The point of the hook turns around the standard part *s* of the catch *m*, and draws the two sashes together, while the cap part *m'* of the catch prevents the sashes from being moved up or down. The form of catch shown in Fig. 1 is that which has been hitherto essayed and found objectionable, and, in fact, should be used only in windows where there is but one flight of glass in the upper sash, for the following reason: In unfastening the window, if the point of the hook is not drawn back clear of the meeting-rail of the upper sash, on raising the lower sash the point of the hook would strike and injure the bars of the sash above. To avoid this difficulty, I make the catch of the form shown in the Figs. 2, 3, and 4. The cap portion *m'* is made to extend lengthwise over the front edge of the plate *n*, and is united with the plate by the standard *w*, thus forming the catch-opening *x*, flush with the edge of the catch-plate *n*, so that the window cannot be unfastened without having the point of the hook entirely clear of the meeting-rail of the upper sash, and out of the way of the bars above when the sash is raised. The catch *m* is cast whole with the plate *n*. The whole may be made of brass or iron, at pleasure. Even with this fastener there is a possibility of the point of the hook being pushed over the line when the sash is raised, by accidental touch or by jostling, and in such case the bars of the sash would be injured, as before mentioned in the case of the other fastenings. To prevent such an occurrence, I make a rise in the edge of plate *e*, at the point *a'*, so that when the point of the hook is without the catch the friction or pressure between the hook and plate shall keep the hook steadily in its place.

It is obvious that the friction of a spring might be employed for this purpose, or other analogous means used with the same results, without changing the character of the invention, the whole construction of the fastener being designed to guard against the possibility of injuring the sash-bars by the projection of the hook-point beyond the line of the meeting-rails, whether by carelessness, inattention, or accident, and at the same time to provide a strong, cheap, and efficient fastener.

What I claim as my improvement in window-fasteners of the class above specified is—

1. Extending the cap portion *m'* of the catch *m* over and along the front edge of the catch-plate *n*, to form a catch-opening, *x*, flush with the edge of plate *n*, so that the window cannot be unfastened without having the point of the hook *a* withdrawn entirely clear from the meeting-rail of the upper sash, and out of the way of the bars above when the lower sash is raised.

2. In combination with the catch *m*, hook *a*, and plate *e*, the check *a'*, or equivalent thereof, for the purposes hereinabove specified.

RALPH J. FALCONER.

Witnesses:
CHAS. G. PAGE,
WM. H. HARRISON.